US010563026B2

United States Patent
Chang et al.

(10) Patent No.: US 10,563,026 B2
(45) Date of Patent: Feb. 18, 2020

(54) HEAT-SHRINKABLE POLYESTER FILM

(71) Applicant: Far Eastern New Century Corporation, Taipei (TW)

(72) Inventors: Li-Ling Chang, Taipei (TW); Chun-Chia Hsu, Taipei (TW); Shu-Chuan Lee, Taipei (TW); Roy Wu, Taipei (TW)

(73) Assignee: Far Eastern New Century Corporation, Taipei (TW)

( * ) Notice: Subject to any disclaimer, the term of this patent is extended or adjusted under 35 U.S.C. 154(b) by 132 days.

(21) Appl. No.: 15/988,163

(22) Filed: May 24, 2018

(65) Prior Publication Data

US 2019/0161589 A1 May 30, 2019

(30) Foreign Application Priority Data

Nov. 28, 2017 (TW) .............................. 106141310 A

(51) Int. Cl.
*C08L 67/02* (2006.01)
*C08J 5/18* (2006.01)
*C08G 63/672* (2006.01)

(52) U.S. Cl.
CPC .............. *C08J 5/18* (2013.01); *C08G 63/672* (2013.01); *C08L 67/02* (2013.01); *C08J 2367/02* (2013.01); *C08J 2367/06* (2013.01); *C08J 2467/02* (2013.01); *C08J 2467/03* (2013.01)

(58) Field of Classification Search
None
See application file for complete search history.

(56) References Cited

U.S. PATENT DOCUMENTS

| | | | |
|---|---|---|---|
| 6,566,447 B1* | 5/2003 | Tokunaga | B32B 27/36 525/63 |
| 6,630,230 B2 | 10/2003 | Homma et al. | |
| 6,663,928 B2 | 12/2003 | Ito et al. | |
| 2015/0018489 A1* | 1/2015 | Shiraishi | C08J 5/18 525/177 |

\* cited by examiner

*Primary Examiner* — Michael J Feely
(74) *Attorney, Agent, or Firm* — Greenberg Traurig, LLP; David J. Dykeman; Natalie Salem

(57) ABSTRACT

A heat-shrinkable polyester film is made from a polyester resin composition which includes an amorphous polyalkylene benzenedicarboxylate resin and a polyester elastomer resin. The polyester elastomer resin includes hard segments and soft segments, and is prepared by copolycondensation of an aromatic dicarboxylic acid and a diol component. The diol component includes a C2-C4 alkylene glycol for the hard segments and a polyethylene glycol with an average molecular weight not greater than 400 for the soft segments. The soft segments of the polyester elastomer resin are in an amount ranging from 1 part by weight to 2 parts by weight based on 100 parts by weight of the polyester resin composition.

7 Claims, No Drawings

HEAT-SHRINKABLE POLYESTER FILM

CROSS-REFERENCE TO RELATED APPLICATION

This application claims priority to Taiwanese Application No. 106141310, filed on Nov. 28, 2017, which is hereby incorporated by reference herein in its entirety.

FIELD

The disclosure relates to a heat-shrinkable polyester film, and more particularly to a heat-shrinkable polyester film which has improved low-temperature heat shrinkability and which effectively suppresses deterioration of heat shrinkability after aging.

BACKGROUND

Polyethylene terephthalate films have heat shrinkability and are good in mechanical and optical properties, and are thus widely used as package films and label films for beverage bottles and the like. However, since polyethylene terephthalate films have high thermal stability, they have a high heat shrinkage initiation temperature and are thus inconvenient in use. Additionally, the heat shrinkability of existing polyethylene terephthalate films is unsatisfactory. Therefore, it is desirable to modify polyethylene terephthalate films so as to lower the heat shrinkage temperature and enhance the heat shrinkability thereof.

U.S. Pat. No. 6,630,230 discloses a polyester resin composition for a polyester film. The polyester film has a heat shrinkage ratio of 15% or more along a main shrinking direction at 70° C. Specifically, the heat shrinkage ratio along the main shrinking direction at 70° C. is in a range from 20% to 22%, as shown in the illustrated examples therein. The polyester resin composition includes an amorphous polyethylene terephthalate resin and a polyester ether resin in admixture at a weight ratio of 97/3 to 50/50. The polyester ether resin is prepared by copolycondensation of dicarboxylic acid and/or ester derivatives thereof, and diols consisting mainly of a C2-C6 alkylene glycol and a poly(C2-C4 alkylene oxide) glycol with a number average molecular weight ranging from 500 to 6000. Segments derived from the poly(C2-C4 alkylene oxide) glycol constitute 1 to 30% by weight of the polyester ether resin. The heat shrinkage ratio of the polyester film at 70° C. is unsatisfactory. Additionally, it is not mentioned therein how deterioration of such physical properties as shrinkability and the like after aging is suppressed.

U.S. Pat. No. 6,663,928 discloses a heat-shrinkage polyester film which has a haze lower than 10% and a heat shrinkage ratio of from 5% to 60% after treatment in hot water at 70° C. for 5 seconds. The heat-shrinkage polyester film is made from a polyester composition which includes a polyester and a polyester elastomer. The polyester has a glass transition temperature of from 60° C. to 75° C. The polyester elastomer is polyester block copolymer composed of high melting point crystalline polyester segments (hard segments) and low melting point soft polymer segments having molecular weights of 400 or higher (soft segments). The melting point of the high molecular weight polymer formed only by the high melting point crystalline polyester segments is 200° C. or higher. Although the heat-shrinkable polyester film disclosed in U.S. Pat. No. 6,663,928 has a heat shrinkage ratio of from 5% to 60% after treatment in hot water at 70° C., it has an inferior haze and the heat shrinkability thereof may be deteriorated after aging.

SUMMARY

An object of the disclosure is to provide a heat-shrinkable polyester film which overcomes the aforesaid drawbacks of the prior art.

According to the disclosure, there is provided a heat-shrinkable polyester film made from a polyester resin composition which comprises an amorphous polyalkylene benzene dicarboxylate resin and a polyester elastomer resin. The polyester elastomer resin includes hard segments and soft segments, and is prepared by copolycondensation of an aromatic dicarboxylic acid and a diol component. The diol component includes a C2-C4 alkylene glycol for the hard segments and a polyethylene glycol with an average molecular weight not greater than 400 for the soft segments. The soft segments of the polyester elastomer resin are in an amount ranging from 1 part by weight to 2 parts by weight based on 100 parts by weight of the polyester resin composition.

DETAILED DESCRIPTION

A heat-shrinkable polyester film according to the disclosure is made from a polyester resin composition which comprises an amorphous polyalkylene benzenedicarboxylate resin and a polyester elastomer resin. The polyester elastomer resin includes hard segments and soft segments, and is prepared by copolycondensation of an aromatic dicarboxylic acid and a diol component. The diol component includes a C2-C4 alkylene glycol for the hard segments and a polyethylene glycol with an average molecular weight not greater than 400 for the soft segments. The soft segments of the polyester elastomer resin are in an amount ranging from 1 part by weight to 2 parts by weight based on 100 parts by weight of the polyester resin composition.

Polyester Resin Composition:

In certain embodiments, the amorphous polyalkylene benzenedicarboxylate resin is in an amount ranging from 85 parts by weight to 95 parts by weight and the polyester elastomer resin is in an amount ranging from 5 parts by weight to 15 parts by weight based on 100 parts by weight of the polyester resin composition.

Amorphous Polyalkylene Benzenedicarboxylate Resin:

The amorphous polyalkylene benzenedicarboxylate resin is prepared by subjecting benzenedicarboxylic acid and alkylene glycol to esterification followed by polycondensation. Examples of benzenedicarboxylic acid include, but are not limited to, terephthalic acid and isophthalic acid, which may be used alone or in admixture thereof. A non-limiting example of alkylene glycol is ethylene glycol. A modifier such as neopentyl glycol, 1,4-cyclohexanedimethanol, and the like may be added in preparation of the amorphous polyalkylene benzenedicarboxylate resin, if desirable.

Polyester Elastomer Resin:

As described above, the polyester elastomer resin is prepared by copolycondensation of an aromatic dicarboxylic acid and a diol component which includes a C2-C4 alkylene glycol and a polyethylene glycol with an average molecular weight not greater than 400.

Examples of the aromatic dicarboxylic acid include, but are not limited to, terephthalic acid, isophthalic acid, which may be used alone or in admixture.

Examples of the C2-C4 alkylene glycol include, but are not limited to, ethylene glycol, propylene glycol, and butylene glycol, which may be used alone or in admixture. In certain embodiments, the C2-C4 alkylene glycol is ethylene glycol.

Examples of the polyethylene glycol with an average molecular weight not greater than 400 include, but are not limited to, a polyethylene glycol with an average molecular weight of 200 and a polyethylene glycol with an average molecular weight of 400, which may be used alone or in admixture.

In certain embodiments, the C2-C4 alkylene glycol is in an amount ranging from 55 parts by weight to 70 parts by weight based on 100 parts by weight of the diol component. In certain embodiments, the polyethylene glycol with an average molecular weight not greater than 400 is in an amount ranging from 30 parts by weight to 45 parts by weight based on 100 parts by weight of the diol component.

In certain embodiments, the diol component is in an amount ranging from 1.0 mole to 1.5 moles based on 1 mole of the aromatic dicarboxylic acid.

In certain embodiments, the copolycondensation is performed at a temperature ranging from 260° C. to 300° C. for a period ranging from 3 hours to 7 hours.

In the polyester elastomer resin thus prepared, the soft segments are poly(ethylene oxide) chains derived from the polyethylene glycol with an average molecular weight not greater than 400. The presence of the soft segments in the polyester elastomer resin permits the heat-shrinkable polyester film thus made to have a glass transition temperature lower than that of conventional heat-shrinkable polyethylene terephthalate films and to have a heat-shrinkage ratio at 70° C. higher than that of the conventional heat-shrinkable polyethylene terephthalate films. In certain embodiments, the soft segments are in an amount ranging from 12 parts by weight to 18 parts by weight based on 100 parts by weight of the polyester elastomer resin so as to provide the heat-shrinkable polyester film thus made with a superior heat shrinkage ratio.

The hard segments are highly crystalline, and are poly(ethylene terephthalate) chains, poly(trimethylene terephthalate) chains, poly(butylene terephthalate) chains, or combinations thereof. The presence of the hard segments in the polyester elastomer resin suppresses relaxation of molecular chains in the heat-shrinkable polyester film and maintains orientation of the molecular chains so as to maintain the heat shrinkability of the heat-shrinkable polyester film during storage. In certain embodiments, the hard segments are in an amount ranging from 82 parts by weight to 88 parts by weight based on 100 parts by weight of the polyester elastomer resin.

Examples of the disclosure will be described hereinafter. It is to be understood that these examples are exemplary and explanatory and should not be construed as a limitation to the disclosure.

Preparation Example 1: Preparation of Amorphous Polyethylene Terephthalate Resin Terephthalic acid (37311 g), ethylene glycol (14027 g), neopentyl glycol (5702 g), and tetraethylammonium hydroxide (13.5 g) were added into a reactor, followed by melting to form a molten mixture. The molten mixture was subjected to an esterification reaction under a nitrogen atmosphere while water produced during the esterification reaction was distilled out of the reactor. When the amount of water distilled reached a predetermined level, antimony oxide ($Sb_2O_3$, 300 ppm) and phosphoric acid (50 ppm) were added into the reactor, followed by a copolymerization reaction at a temperature of 270° C. under a vacuum atmosphere until a relative viscosity ranging from 1.6 to 1.8 was reached, thereby obtaining an amorphous polyethylene terephthalate resin.

Preparation Example 2: Preparation of Polyester Elastomer Resin

Terephthalic acid (34880 g), ethylene glycol (14195 g), PEG-200 (polyethylene glycol with a weight average molecular weight of 200, 6750 g), and tetraethylammonium hydroxide (13.5 g) were added into a reactor, followed by melting to form a molten mixture. The molten mixture was subjected to an esterification reaction under a nitrogen atmosphere while water produced during the esterification reaction was distilled out of the reactor. When the amount of water distilled reached a predetermined level, antimony oxide ($Sb_2O_3$, 300 ppm) and phosphoric acid (50 ppm) were added into the reactor, followed by a copolymerization reaction at a temperature of 270° C. under a vacuum atmosphere until a relative viscosity ranging from 1.6 to 1.8 was reached, thereby obtaining a polyester elastomer resin (45 kg) containing polyethylene glycol segments as the soft segments in an amount of 15 parts by weight based on 100 parts by weight of the polyester elastomer resin.

Preparation Example 3: Preparation of Polyester Elastomer Resin

Terephthalic acid (33974 g), ethylene glycol (14820 g), PEG-400 (polyethylene glycol with a weight average molecular weight of 400, 6750 g), and tetraethylammonium hydroxide (13.5 g) were added into a reactor, followed by melting to form a molten mixture. The molten mixture was subjected to an esterification reaction under a nitrogen atmosphere while water produced during the esterification reaction was distilled out of the reactor. When the amount of water distilled reached a predetermined level, antimony oxide ($Sb_2O_3$, 300 ppm) and phosphoric acid (50 ppm) were added into the reactor, followed by a copolymerization reaction at a temperature of 270° C. under a vacuum atmosphere until a relative viscosity ranging from 1.6 to 1.8 was reached, thereby obtaining apolyester elastomer resin (45 kg) containing polyethylene glycol segments as the soft segments in an amount of 15 parts by weight based on 100 parts by weight of the polyester elastomer resin.

Preparation Example 4: Preparation of Polyester Elastomer Resin

Terephthalic acid (35254 g), ethylene glycol (16189 g), PTMEG-1000 (polytetramethylene oxide glycol with a weight average molecular weight of 1000, 4500 g), and tetraethylammonium hydroxide (13.5 g) were added into a reactor, followed by melting to form a molten mixture.

The molten mixture was subjected to an esterification reaction under a nitrogen atmosphere while water produced during the esterification reaction was distilled out of the reactor. When the amount of water distilled reached a predetermined level, antimony oxide ($Sb_2O_3$, 300 ppm) and phosphoric acid (50 ppm) were added into the reactor, followed by a copolymerization reaction at a temperature of 270° C. under a vacuum atmosphere until a relative viscosity ranging from 1.6 to 1.8 was reached, thereby obtaining a polyester elastomer resin (45 kg) containing polytetramethylene oxide glycol segments as the soft segments in an amount of 10 parts by weight based on 100 parts by weight of the polyester elastomer resin.

Example 1: Preparation of a Heat-Shrinkable Polyester Film 93 parts by weight of the amorphous polyethylene terephthalate resin prepared in Preparation Example 1 was mixed with 7 parts by weight of the polyester elastomer resin prepared in Preparation Example 2, followed by a drying treatment at 60° C. for 12 hours to form a polyester resin composition in which the polyethylene glycol segments as the soft segments was in an amount of 1.05 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 μm. The sheet-like body was cut to obtain a sheet having a dimension of 22 cm in a machine direction, a dimension of 12 cm in a transverse direction, and a thickness of 160 μm. The sheet was stretched along the transverse direction on a stretching machine (BRUCKNER KARO IV) under stretching conditions of standing at 88° C. for 90 seconds, stretching at 78° C. at a stretching speed of 34%/sec until the dimension of the sheet in the transverse direction was four times the original dimension, and then standing at 60° C. for 8 seconds, to form a film having a thickness of 40 μm. The film was then cooled to obtain a heat-shrinkable polyester film.

Example 2: Preparation of a Heat-Shrinkable Polyester Film 90 parts by weight of the amorphous polyethylene terephthalate resin prepared in Preparation Example 1 was mixed with 10 parts by weight of the polyester elastomer resin prepared in Preparation Example 2, followed by a drying treatment at 60° C. for 12 hours to form a polyester resin composition in which the polyethylene glycol segments as the soft segments was in an amount of 1.50 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 μm. The sheet-like body was cut to obtain a sheet having a dimension of 22 cm in a machine direction, a dimension of 12 cm in a transverse direction, and a thickness of 160 μm. The sheet was stretched along the transverse direction on a stretching machine (BRUCKNER KARO IV) under stretching conditions of standing at 88° C. for 90 seconds, stretching at 77° C. at a stretching speed of 34%/sec until the dimension of the sheet in the transverse direction was four times the original dimension, and then standing at 60° C. for 8 seconds, to form a film having a thickness of 40 μm. The film was then cooled to obtain a heat-shrinkable polyester film.

Example 3: Preparation of a Heat-Shrinkable Polyester Film 87 parts by weight of the amorphous polyethylene terephthalate resin prepared in Preparation Example 1 was mixed with 13 parts by weight of the polyester elastomer resin prepared in Preparation Example 2, followed by a drying treatment at 60° C. for 12 hours to form a polyester resin composition in which the polyethylene glycol segments as the soft segments was in an amount of 1.95 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 μm. The sheet-like body was cut to obtain a sheet having a dimension of 22 cm in a machine direction, a dimension of 12 cm in a transverse direction, and a thickness of 160 μm. The sheet was stretched along the transverse direction on a stretching machine (BRUCKNER KARO IV) under stretching conditions of standing at 88° C. for 90 seconds, stretching at 75° C. at a stretching speed of 34%/sec until the dimension of the sheet in the transverse direction was four times the original dimension, and then standing at 60° C. for 8 seconds, to form a film having a thickness of 40 μm. The film was then cooled to obtain a heat-shrinkable polyester film.

Example 4: Preparation of a Heat-Shrinkable Polyester Film 93 parts by weight of the amorphous polyethylene terephthalate resin prepared in Preparation Example 1 was mixed with 7 parts by weight of the polyester elastomer resin prepared in Preparation Example 3, followed by a drying treatment at 60° C. for 12 hours to form a polyester resin composition in which the polyethylene glycol segments as the soft segments was in an amount of 1.05 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 μm. The sheet-like body was cut to obtain a sheet having a dimension of 22 cm in a machine direction, a dimension of 12 cm in a transverse direction, and a thickness of 160 μm. The sheet was stretched along the transverse direction on a stretching machine (BRUCKNER KARO IV) under stretching conditions of standing at 88° C. for 90 seconds, stretching at 73° C. at a stretching speed of 34%/sec until the dimension of the sheet in the transverse direction was four times the original dimension, and then standing at 58° C. for 8 seconds, to form a film having a thickness of 40 μm. The film was then cooled to obtain a heat-shrinkable polyester film.

Example 5: Preparation of a Heat-Shrinkable Polyester Film 90 parts by weight of the amorphous polyethylene terephthalate resin prepared in Preparation Example 1 was mixed with 10 parts by weight of the polyester elastomer resin prepared in Preparation Example 3, followed by a drying treatment at 60° C. for 12 hours to form a polyester resin composition in which the polyethylene glycol segments as the soft segments was in an amount of 1.50 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 μm. The sheet-like body was cut to obtain a sheet having a dimension of 22 cm in a machine direction, a dimension of 12 cm in a transverse direction, and a thickness of 160 μm. The sheet was stretched along the transverse direction on a stretching machine (BRUCKNER KARO IV) under stretching conditions of standing at 88° C. for 90 seconds, stretching at 72° C. at a stretching speed of 34%/sec until the dimension of the sheet in the transverse direction was four times the original dimension, and then standing at 58° C. for 8 seconds, to form a film having a thickness of 40 µm. The film was then cooled to obtain a heat-shrinkable polyester film.

Example 6: Preparation of a Heat-Shrinkable Polyester Film 87 parts by weight of the amorphous polyethylene terephthalate resin prepared in Preparation Example 1 was mixed with 13 parts by weight of the polyester elastomer resin prepared in Preparation Example 3, followed by a drying treatment at 60° C. for 12 hours to form a polyester resin composition in which the polyethylene glycol segments as the soft segments was in an amount of 1.95 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 µm. The sheet-like body was cut to obtain a sheet having a dimension of 22 cm in a machine direction, a dimension of 12 cm in a transverse direction, and a thickness of 160 µm. The sheet was stretched along the transverse direction on a stretching machine (BRUCKNER KARO IV) under stretching conditions of standing at 88° C. for 90 seconds, stretching at 70° C. at a stretching speed of 34%/sec until the dimension of the sheet in the transverse direction was four times the original dimension, and then standing at 58° C. for 8 seconds, to form a film having a thickness of 40 µm. The film was then cooled to obtain a heat-shrinkable polyester film.

Comparative Example 1: Preparation of a Heat-Shrinkable Polyester Film 100 parts by weight of the amorphous polyethylene terephthalate resin prepared in Preparation Example 1 was dried at 60° C. for 12 hours, and was then molten and extruded using a single-screw extruder (L/D=28, 0=45) at a temperature ranging from 210° C. to 255° C. to obtain a sheet-like body having a thickness of 160 µm. The sheet-like body was cut to obtain a sheet having a dimension of 22 cm in a machine direction, a dimension of 12 cm in a transverse direction, and a thickness of 160 µm. The sheet was stretched along the transverse direction on a stretching machine (BRUCKNER KARO IV) under stretching conditions of standing at 88° C. for 90 seconds, stretching at 81° C. at a stretching speed of 34%/sec until the dimension of the sheet in the transverse direction was four times the original dimension, and then standing at 65° C. for 8 seconds, to form a film having a thickness of 40 µm. The film was then cooled to obtain a heat-shrinkable polyester film.

Comparative Example 2: Preparation of a Heat-Shrinkable Polyester Film 80 parts by weight of the amorphous polyethylene terephthalate resin prepared in Preparation Example 1 was mixed with 20 parts by weight of the polyester elastomer resin prepared in Preparation Example 2, followed by a drying treatment at 60° C. for 12 hours to form a polyester resin composition in which the polyethylene glycol segments as the soft segments was in an amount of 3.0 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 µm. The sheet-like body was cut to obtain a sheet having a dimension of 22 cm in a machine direction, a dimension of 12 cm in a transverse direction, and a thickness of 160 µm. The sheet was stretched along the transverse direction on a stretching machine (BRUCKNER KARO IV) under stretching conditions of standing at 88° C. for 90 seconds, stretching at 70° C. at a stretching speed of 34%/sec until the dimension of the sheet in the transverse direction was four times the original dimension, and then standing at 58° C. for 8 seconds, to form a film having a thickness of 40 µm. The film was then cooled to obtain a heat-shrinkable polyester film.

Comparative Example 3: Preparation of a Heat-Shrinkable Polyester Film 80 parts by weight of the amorphous polyethylene terephthalate resin prepared in Preparation Example 1 was mixed with 20 parts by weight of the polyester elastomer resin prepared in Preparation Example 3, followed by a drying treatment at 60° C. for 12 hours to form a polyester resin composition in which the polyethylene glycol segments as the soft segments was in an amount of 3.0 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 µm. The sheet-like body was cut to obtain a sheet having a dimension of 22 cm in a machine direction, a dimension of 12 cm in a transverse direction, and a thickness of 160 µm. The sheet was stretched along the transverse direction on a stretching machine (BRUCKNER KARO IV) under stretching conditions of standing at 88° C. for 90 seconds, stretching at 70° C. at a stretching speed of 34%/sec until the dimension of the sheet in the transverse direction was four times the original dimension, and then standing at 58° C. for 8 seconds, to form a film having a thickness of 40 µm. The film was then cooled to obtain a heat-shrinkable polyester film.

Comparative Example 4: Preparation of a Heat-Shrinkable Polyester Film 90 parts by weight of the amorphous polyethylene terephthalate resin prepared in Preparation Example 1 was mixed with 10 parts by weight of the polyester elastomer resin prepared in Preparation Example 4, followed by a drying treatment at 60° C. for 12 hours to form a polyester resin composition in which the polytetramethylene oxide glycol segments as the soft segments was in an amount of 1.0 part by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 µm. The sheet-like body was cut to obtain a sheet having a dimension of 22 cm in a machine direction, a dimension of 12 cm in a transverse direction, and a thickness of 160 µm. The sheet was stretched along the transverse direction on a stretching machine (BRUCKNER KARO IV) under stretching conditions of standing at 88° C. for 90 seconds, stretching at 80° C. at a stretching speed of 34%/sec until the dimension of the sheet in the transverse direction was four times the original dimension, and then standing at 65° C. for 8 seconds, to form a film having a thickness of 40 µm. The film was then cooled to obtain a heat-shrinkable polyester film.

Comparative Example 5: Preparation of a Heat-Shrinkable Polyester Film 80 parts by weight of the amorphous polyethylene terephthalate resin prepared in Preparation Example 1 was mixed with 20 parts by weight of the polyester elastomer resin prepared in Preparation Example 4, followed by a drying treatment at 60° C. for 12 hours to form a polyester resin composition in which the polytetramethylene oxide glycol segments as the soft segments was in an amount of 2.0 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 μm. The sheet-like body was cut to obtain a sheet having a dimension of 22 cm in a machine direction, a dimension of 12 cm in a transverse direction, and a thickness of 160 μm. The sheet was stretched along the transverse direction on a stretching machine (BRUCKNER KARO IV) under stretching conditions of standing at 88° C. for 90 seconds, stretching at 77° C. at a stretching speed of 34%/sec until the dimension of the sheet in the transverse direction was four times the original dimension, and then standing at 63° C. for 8 seconds, to form a film having a thickness of 40 μm. The film was then cooled to obtain a heat-shrinkable polyester film.

Comparative Example 6: Preparation of a Heat-Shrinkable Polyester Film 70 parts by weight of the amorphous polyethylene terephthalate resin prepared in Preparation Example 1 was mixed with 30 parts by weight of the polyester elastomer resin prepared in Preparation Example 4, followed by a drying treatment at 60° C. for 12 hours to form a polyester resin composition in which the polytetramethylene oxide glycol segments as the soft segments was in an amount of 3.0 parts by weight based on 100 parts by weight of the polyester resin composition. The polyester resin composition was molten and extruded using a single-screw extruder (L/D=28, φ=45) at a temperature ranging from 210° C. to 255° C. to obtain a sheet-like body having a thickness of 160 μm. The sheet-like body was cut to obtain a sheet having a dimension of 22 cm in a machine direction, a dimension of 12 cm in a transverse direction, and a thickness of 160 μm. The sheet was stretched along the transverse direction on a stretching machine (BRUCKNER KARO IV) under stretching conditions of standing at 88° C. for 90 seconds, stretching at 73° C. at a stretching speed of 34%/sec until the dimension of the sheet in the transverse direction was four times the original dimension, and then standing at 60° C. for 8 seconds, to form a film having a thickness of 40 μm. The film was then cooled to obtain a heat-shrinkable polyester film.

Evaluation Items:
Glass Transition Temperature (Tg, in ° C.):

The glass transition temperature (Tg) of each of the heat-shrinkable polyester films obtained in Examples 1 to 6 and Comparative Examples 1 to 6 was measured using a differential scanning calorimeter (DSC, TA Instruments Q2000) manufactured by TA Instruments through heating from 0° C. to 300° C. at a heating rate of 10° C./min.

Heat Shrinkage Rate (in %) in a Transverse Direction Under a Heat Treatment at 95° C.:

The heat shrinkage rate was measured according to JIS Z1709. Each of the heat-shrinkable polyester films obtained in Examples 1 to 6 and Comparative Examples 1 to 6 was cut to prepare a test sample having a dimension of 100 mm in a machine direction and a dimension of 100 mm in a transverse direction. The test sample was immersed in hot water at 95° C. for 10 seconds, and was then cooled in cool water at 30° C. for 30 seconds. The dimension ($A_{95}$, in mm) in the transverse direction was measured. The heat shrinkage rate was calculated according a formula as follows:

Heat Shrinkage Rate=$[(100-A_{95})/100] \times 100\%$.

Heat Shrinkage Rate (in %) in a Transverse Direction Under a Heat Treatment at 70° C.:

The heat shrinkage rate was measured according to JIS Z1709. Each of the heat-shrinkable polyester films obtained in Examples 1 to 6 and Comparative Examples 1 to 6 was cut to prepare a test sample having a dimension of 100 mm in a machine direction and a dimension of 100 mm in a transverse direction. The test sample was immersed in hot water at 70° C. for 10 seconds, and was then cooled in cool water at 30° C. for 30 seconds. The dimension ($A_{70}$, in mm) in the transverse direction was measured. The heat shrinkage rate was calculated according a formula as follows:

Heat Shrinkage Rate=$[(100-A_{70})/100] \times 100\%$.

Heat Shrinkage Rate (in %) in a Transverse Direction Under a Heat Treatment at 70° C. after Aging:

The heat shrinkage rate was measured according to JIS Z1709. Each of the heat-shrinkable polyester films obtained in Examples 1 to 6 and Comparative Examples 1 to 6 was cut to prepare a test sample having a dimension of 100 mm in a machine direction and a dimension of 100 mm in a transverse direction. The test sample was baked in an oven at 60° C. for 1 hour, which was equivalent to storage at room temperature for 1 month. The test sample was then immersed in hot water at 70° C. for 10 seconds, and was then cooled in cool water at 30° C. for 30 seconds. The dimension ($A_{aged}$, in mm) in the transverse direction was measured. The heat shrinkage rate was calculated according a formula as follows:

Heat Shrinkage Rate=$[(100-A_{aged})/100] \times 100\%$.

Variation of Heat Shrinkage Rate in a Transverse Direction after Aging:

Variation of heat shrinkage rate in a transverse direction under a heat treatment at 70° C. between before and after aging was calculated according a formula as follows:

$V_s=[(S_1-S_2)/S_1] \times 100\%$, wherein $V_s$ is variation of heat shrinkage rate in a transverse direction under a heat treatment at 70° C. before and after aging;

$S_1$ is heat shrinkage rate in a transverse direction under a heat treatment at 70° C. before aging; and $S_2$ is heat shrinkage rate in a transverse direction under a heat treatment at 70° C. after aging.

Shrinkage Force (in MPa) in a Transverse Direction:

Each of the heat-shrinkable polyester films obtained in Examples 1 to 6 and Comparative Examples 1 to 6 was cut to prepare a test sample having a dimension of 15 mm in a machine direction and a dimension of 100 mm in a transverse direction. Two opposite ends of the test sample in the transverse direction was clipped using a material testing machine (QC-508B1, Cometech Testing Machines Co., Limited). The test sample was then blown by hot air at 110° C. at a distance of 25 mm from the test sample. After 30 seconds, a maximum value of the shrinkage force was recorded.

Elongation at Break (in %) in a Machine Direction:

Each of the heat-shrinkable polyester films obtained in Examples 1 to 6 and Comparative Examples 1 to 6 was cut to prepare a test sample having a dimension of 150 mm in a machine direction and a dimension of 15 mm in a transverse direction. Two opposite ends of the test sample in the machine direction was clipped using a material testing machine (QC-508B1, Cometech Testing Machines Co., Limited). Then the test sample was stretched until breakage of the test sample, and the dimension (inmm) of test sample in the machine direction was recorded. Elongation at break (in %) in the machine direction was calculated by a formula as follows:

$$E=[(D-150)/150]\times100\%,$$

wherein

E: elongation at break in a machine direction; and

D: dimension of the test sample in the machine direction at break.

Elongation at Break (in %) in a Machine Direction after Aging:

Each of the heat-shrinkable polyester films obtained in Examples 1 to 6 and Comparative Examples 1 to 6 was cut to prepare a test sample having a dimension of 150 mm in a machine direction and a dimension of 15 mm in a transverse direction. The test sample was baked in an oven at 60° C. for 1 hour. Two opposite ends of the test sample in the machine direction was then clipped using a material testing machine (QC-508B1, Cometech Testing Machines Co., Limited). Then the test sample was stretched until breakage of the test sample, and the dimension (in mm) of test sample in the machine direction was recorded. Elongation at break (in %) in the machine direction was calculated by a formula as follows:

$$E_{aged}=[(D_{aged}-150)/150]\times100\%,$$

wherein $E_{aged}$: elongation at break in a machine direction after aging; and $D_{aged}$: dimension of the aged test sample in the machine direction at break.

Variation (in %) of Elongation at Break in a Machine Direction Between Before and after Aging:

Variation (in %) of elongation at break in a machine direction between before and after aging was calculated according a formula as follows:

$$V_e=[(E-E_{aged})/E]\times100\%,$$

wherein $V_e$: variation of elongation at break in a machine direction between before and after aging;

E: elongation at break in the machine direction before aging; and $E_{aged}$: elongation at break in the machine direction after aging.

Haze (in %):

Haze of each of the heat-shrinkable polyester films obtained in Examples 1 to 6 and Comparative Example 1 to 6 was measured by a haze meter (Nippon Denshoku, Japan) according to ASTM D-1003.

Evaluation results of the heat-shrinkable polyester films obtained in Examples 1 to 6 and Comparative Example 1 to 6 are shown in Tables 1 and 2.

TABLE 1

|  |  | Exs. | | | | | |
| --- | --- | --- | --- | --- | --- | --- | --- |
|  |  | 1 | 2 | 3 | 4 | 5 | 6 |
| Prep. Exs. (Parts by weight) | 1 | 93 | 90 | 87 | 93 | 90 | 87 |
|  | 2 | 7 | 10 | 13 | — | — | — |
|  | 3 | — | — | — | 7 | 10 | 13 |
|  | 4 | — | — | — | — | — | — |
| Amount of soft segments (Parts by weight) |  | 1.05 | 1.50 | 1.95 | 1.05 | 1.50 | 1.95 |
| Glass transition temperature of heat-shrinkable polyester film (Tg, ° C.) |  | 72.3 | 71.6 | 69.8 | 70.1 | 68.0 | 66.2 |
| Heat shrinkage rate in a transverse direction under a heat treatment at 95° C. (%) |  | 72.5 | 72.3 | 71.3 | 72.6 | 73.0 | 71.8 |
| Heat shrinkage rate in a transverse direction under a heat treatment at 70° C. (%) |  | 32.4 | 37.0 | 42.0 | 46.1 | 54.3 | 55.0 |
| Heat shrinkage rate in a transverse direction under a heat treatment at 70° C. after aging (%) |  | 28.7 | 32.9 | 37.4 | 40.8 | 48.2 | 47.9 |
| Variation of heat shrinkage rate in a transverse direction between before and after aging (%) |  | 11.4 | 11.1 | 11.0 | 11.5 | 11.2 | 12.9 |
| Shrinkage force in a transverse direction (MPa) |  | 9.3 | 9.5 | 9.3 | 9.0 | 8.8 | 8.9 |
| Elongation at break in a machine direction (%) |  | 530 | 521 | 482 | 501 | 492 | 487 |
| Elongation at break in a machine direction after aging (%) |  | 489 | 499 | 204 | 295 | 189 | 124 |
| Variation of elongation at break in a machine direction between before and after aging (%) |  | 7.7 | 4.2 | 57.7 | 41.1 | 61.6 | 74.5 |
| Haze (%) |  | 1.04 | 1.11 | 1.20 | 1.01 | 0.9 | 0.93 |

TABLE 2

|  |  | Comp. Exs. | | | | | |
| --- | --- | --- | --- | --- | --- | --- | --- |
|  |  | 1 | 2 | 3 | 4 | 5 | 6 |
| Prep. Exs. | 1 | 100 | 80 | 80 | 90 | 80 | 70 |
| (Parts by weight) | 2 | — | 20 | — | — | — | — |
|  | 3 | — | — | 20 | — | — | — |
|  | 4 | — | — | — | 10 | 20 | 30 |
| Amount of soft segments (Parts by weight) |  | 0 | 3.0 | 3.0 | 1 | 2 | 3 |
| Glass transition temperature of heat-shrinkable polyester film (Tg, ° C.) |  | 77.0 | 67.7 | 65.6 | 76.2 | 75.3 | 74.2 |
| Heat shrinkage rate in a transverse direction under a heat treatment at 95° C. (%) |  | 73.5 | 70.5 | 66.7 | 72.4 | 70.1 | 67.2 |
| Heat shrinkage rate in a transverse direction under a heat treatment at 70° C. (%) |  | 21.0 | 57.8 | 54.8 | 29.2 | 34.7 | 39.8 |
| Heat shrinkage rate in a transverse direction under a heat treatment at 70° C. after aging (%) |  | 5.7 | 50.2 | 46.7 | 25.6 | 30.5 | 34.3 |
| Variation of heat shrinkage rate in a transverse direction between before and after aging (%) |  | 72.9 | 13.1 | 14.8 | 12.3 | 12.1 | 13.8 |
| Shrinkage force in a transverse direction (MPa) |  | 9.5 | 9.0 | 7.8 | 9.3 | 9.4 | 9.2 |
| Elongation at break in a machine direction (%) |  | 536 | 477 | 322 | 512 | 465 | 434 |
| Elongation at break in a machine direction after aging (%) |  | 490 | 65 | 43 | 489 | 304 | 207 |
| Variation of elongation at break in a machine direction between before and after aging (%) |  | 8.6 | 86.4 | 86.6 | 4.5 | 34.6 | 52.3 |
| Haze (%) |  | 1.46 | 0.98 | 0.98 | 7.3 | 10.7 | 14.8 |

As shown in Tables 1 and 2, for the heat-shrinkable polyester films obtained in Comparative Examples 2 and 3, the amounts of soft segments are larger than 2 parts by weight, and variations of the heat shrinkage rate in a transverse direction under a heat treatment at 70° C. between before and after aging are 13.1% and 14.8%, respectively. For the heat-shrinkable polyester films obtained in Examples 1 to 6, the amounts of soft segments are in a range from 1 part by weight to 2 parts by weight, and variations of the heat shrinkage rate under a heat treatment at 70° C. between before and after aging are in a range from 11.0% to 12.9%, which are smaller than those for the heat-shrinkable polyester films obtained in Comparative Examples 2 and 3, indicating that the heat-shrinkable polyester film according to the disclosure effectively suppresses deterioration of shrinkability after aging. In addition, for the heat-shrinkable polyester films obtained in Comparative Examples 2 and 3, elongations at break in a machine direction after aging are 65% and 43% (i.e., <100%), indicating that the heat-shrinkable polyester films are liable to break in subsequent processing. Furthermore, for the heat-shrinkable polyester film obtained in Comparative Example 3, the heat shrinkage rate in a transverse direction under a heat treatment at 95° C. is 66.7% (i.e., <70%), indicating that the heat shrinkability of the heat-shrinkable polyester film obtained in Comparative Example 3 was inferior.

For the heat-shrinkable polyester films obtained in Comparative Examples 4 and 5, which contain polytetramethylene oxide glycol with a weight average molecular weight of 1000 (i.e., >400) as the soft segments, hazes are larger than 3%. For the heat-shrinkable polyester films obtained in Examples 1 to 6, which contains polyethylene glycol with a weight average molecular weight of not larger than 400 as the soft segments, hazes are significantly lower. In addition, for the heat-shrinkable polyester film obtained in Comparative Example 4, the heat shrinkage rate in a transverse direction under a heat treatment at 70° C. is 29.2% (i.e., <30%), indicating that the heat shrinkability of the heat-shrinkable polyester film obtained in Comparative Example 4 at low temperature is inferior.

For the heat-shrinkable polyester film obtained in Comparative Example 6, which contains polytetramethylene oxide glycol with a weight average molecular weight of 1000 (i.e., >400) as the soft segments in an amount larger than 2 parts by weight, haze is as high as 14.8, variation of the heat shrinkage rate in a transverse direction under a heat treatment at 70° C. between before and after aging is 13.8%, and the heat shrinkage rate in a transverse direction under a heat treatment at 95° C. is 67.2% (i.e., <70%), indicating that the heat-shrinkable polyester film obtained in Comparative Example 6 has inferior heat shrinkability. For the heat-shrinkable polyester films obtained in Examples 1 to 6, which contain polyethylene glycol with a weight average molecular weight of not larger than 400 as the soft segments in an amount ranging from 1 part by weight to 2 parts by weight, hazes are in a range from 0.9% to 1.20%, variations of the heat shrinkage rate in a transverse direction under a heat treatment at 70° C. between before and after aging are in a range from 11.0% to 12.9%, and the heat shrinkage rate in a transverse direction under a heat treatment at 95° C. is not less than 71.3% (i.e., >70%), indicating that the heat-shrinkable polyester film according to the disclosure has a significantly reduced haze and effectively suppresses deterioration of shrinkability after aging.

In view of the aforesaid, the heat-shrinkable polyester film according to the disclosure in which a characteristic polyester elastomer resin is used has a significantly reduced haze and effectively suppresses deterioration of shrinkability during aging.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A heat-shrinkable polyester film made from a polyester resin composition comprising
    an amorphous polyalkylene benzenedicarboxylate resin, and
    a polyester elastomer resin which includes hard segments and soft segments and which is prepared by copolycondensation of an aromatic dicarboxylic acid and a diol component that includes a C2-C4 alkylene glycol for said hard segments and a polyethylene glycol with an average molecular weight not greater than 400 for said soft segments,
    wherein said soft segments of said polyester elastomer resin are in an amount ranging from 1 part by weight to 2 parts by weight based on 100 parts by weight of said polyester resin composition.

2. The heat-shrinkable polyester film according to claim 1, wherein said C2-C4 alkylene glycol is ethylene glycol.

3. The heat-shrinkable polyester film according to claim 1, wherein said aromatic dicarboxylic acid is terephthalic acid.

4. The heat-shrinkable polyester film according to claim 1, wherein said amorphous polyalkylene benzenedicarboxylate resin is in an amount ranging from 85 parts by weight to 95 parts by weight based on 100 parts by weight of said polyester resin composition.

5. The heat-shrinkable polyester film according to claim 1, wherein said polyester elastomer resin is in an amount ranging from 5 parts by weight to 15 parts by weight based on 100 parts by weight of said polyester resin composition.

6. The heat-shrinkable polyester film according to claim 1, wherein said C2-C4 alkylene glycol is in an amount ranging from 55 parts by weight to 70 parts by weight based on 100 parts by weight of said diol component.

7. The heat-shrinkable polyester film according to claim 1, wherein said polyethylene glycol with an average molecular weight not greater than 400 is in an amount ranging from 30 parts by weight to 45 parts by weight based on 100 parts by weight of said diol component.

* * * * *